United States Patent
Kline

(10) Patent No.: US 8,915,044 B2
(45) Date of Patent: Dec. 23, 2014

(54) WALL BOARD CLIP AND MOUNT APPARATUS

(71) Applicant: Steven Lee Kline, Overland Park, KS (US)

(72) Inventor: Steven Lee Kline, Overland Park, KS (US)

(*) Notice: Subject to any disclaimer, the term of this patent is extended or adjusted under 35 U.S.C. 154(b) by 0 days.

(21) Appl. No.: 13/694,054

(22) Filed: Oct. 24, 2012

(65) Prior Publication Data

US 2013/0126694 A1 May 23, 2013

Related U.S. Application Data

(60) Provisional application No. 61/628,294, filed on Oct. 28, 2011.

(51) Int. Cl.
*E04C 2/38* (2006.01)
*E04C 2/00* (2006.01)
*F16M 13/00* (2006.01)

(52) U.S. Cl.
CPC . *F16M 13/00* (2013.01); *E04C 2/00* (2013.01)
USPC ............... 52/716.8; 52/506.01; 52/506.05; 248/316.8; 248/346.03

(58) Field of Classification Search
USPC ............ 248/346.5, 316.1, 316.7, 316.8, 909, 248/548, 549, 346.03; 52/716.8, 800.12, 52/287.1, 506.01, 506.05
See application file for complete search history.

(56) References Cited

U.S. PATENT DOCUMENTS

| | | | |
|---|---|---|---|
| 2,918,244 A * | 12/1959 | Laney | 248/214 |
| 3,039,232 A * | 6/1962 | Dunn | 52/396.04 |
| 3,349,533 A * | 10/1967 | Gregoire | 52/716.8 |
| 3,393,484 A * | 7/1968 | Dunnington | 52/287.1 |
| 3,797,795 A * | 3/1974 | Hemgren | 248/316.7 |
| 3,807,675 A * | 4/1974 | Seckerson et al. | 248/73 |
| 4,913,576 A * | 4/1990 | Grant, Jr. | 403/13 |
| 4,914,888 A * | 4/1990 | Hanson | 52/768 |
| 5,137,243 A * | 8/1992 | Stevens et al. | 248/316.7 |
| 5,762,304 A * | 6/1998 | Hyatt | 248/176.1 |
| 5,848,508 A * | 12/1998 | Albrecht | 52/309.9 |
| 5,976,663 A * | 11/1999 | Davis et al. | 428/81 |
| 6,158,915 A * | 12/2000 | Kise | 403/309 |
| 6,203,878 B1 * | 3/2001 | Davis et al. | 428/83 |
| 6,216,987 B1 * | 4/2001 | Fukuo | 248/74.2 |
| 6,550,217 B2 * | 4/2003 | Heung-Bin | 52/800.11 |
| 6,637,716 B2 * | 10/2003 | Wear | 248/489 |
| 7,299,595 B1 * | 11/2007 | Anderson, Sr. | 52/506.05 |
| 7,431,590 B2 * | 10/2008 | Gerhardt | 434/408 |
| 7,597,296 B2 * | 10/2009 | Conway | 248/229.16 |
| 2010/0001164 A1 * | 1/2010 | Wear | 248/475.1 |
| 2010/0325969 A1 * | 12/2010 | Hourihan | 52/35 |
| 2012/0037779 A1 * | 2/2012 | Price | 248/316.7 |

* cited by examiner

*Primary Examiner* — Nkeisha Smith
(74) *Attorney, Agent, or Firm* — Law Office of Mark Brown, LLC; Christopher M. DeBacker

(57) ABSTRACT

A mounting clip for use in the construction industry. This device will be used to effectively and efficiently establish a gap under the bottom edge of a building wall board, such as sheet rock or gypsum boards. Hanging of building panels on wall assemblies in building construction projects is very common. The present invention is a gapping device which fits onto the bottom edge of sheet rock wall board like a shoe. The clip holds the sheet rock in position raised off of the floor while the sheet rock hanger permanently affixes the panel to the panel support area, typically a stud wall. The clip prevents moisture from wicking from the floor into the wall board material The clip is designed to become a permanent fixture in the final wall construction.

6 Claims, 3 Drawing Sheets

WALL BOARD CLIP AND MOUNT APPARATUS

CROSS-REFERENCE TO RELATED APPLICATIONS

This application claims priority in U.S. Provisional Patent Application No. 61/628,294 filed on Oct. 28, 2011, which is incorporated herein by reference.

BACKGROUND

Sheet rock/gypsum board is a common material used in construction. A common problem observed with sheet rock and other wall panel surfaces is moisture wicking into the panel from concrete floors or other flooring surfaces. Occasionally, contractors will attempt to address this issue by hanging wall panels suspended a small distance above the floor. A problem can arise if the fasteners fail to hold the panel in place, causing the panel to fall. An additional problem is ascertaining that the panels are hung at a uniform distance above the floor.

What is needed is a cheap, disposable device which mounts to the base of a sheet rock panel, or other wall panel type, and raises the panel away from the floor by a preferred distance to avoid moisture wicking into that panel.

BRIEF SUMMARY OF THE INVENTION

For use in the construction industry, this device will be used to effectively and efficiently establish a needed gap under the bottom edge of a building wall board, such as sheet rock/gypsum boards. Hanging of building panels/sheet rock on wall assemblies in building construction projects is very common. The present invention is a gapping device which fits onto the bottom edge of sheet rock wall board like a shoe. The clip holds the sheet rock in position raised off of the floor while the sheet rock hanger permanently affixes the panel to the panel support area, typically a stud wall.

The clip will have a reinforced spacer base with optional height requirements and requests per the user and crush resistance strength.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

Figure 1:
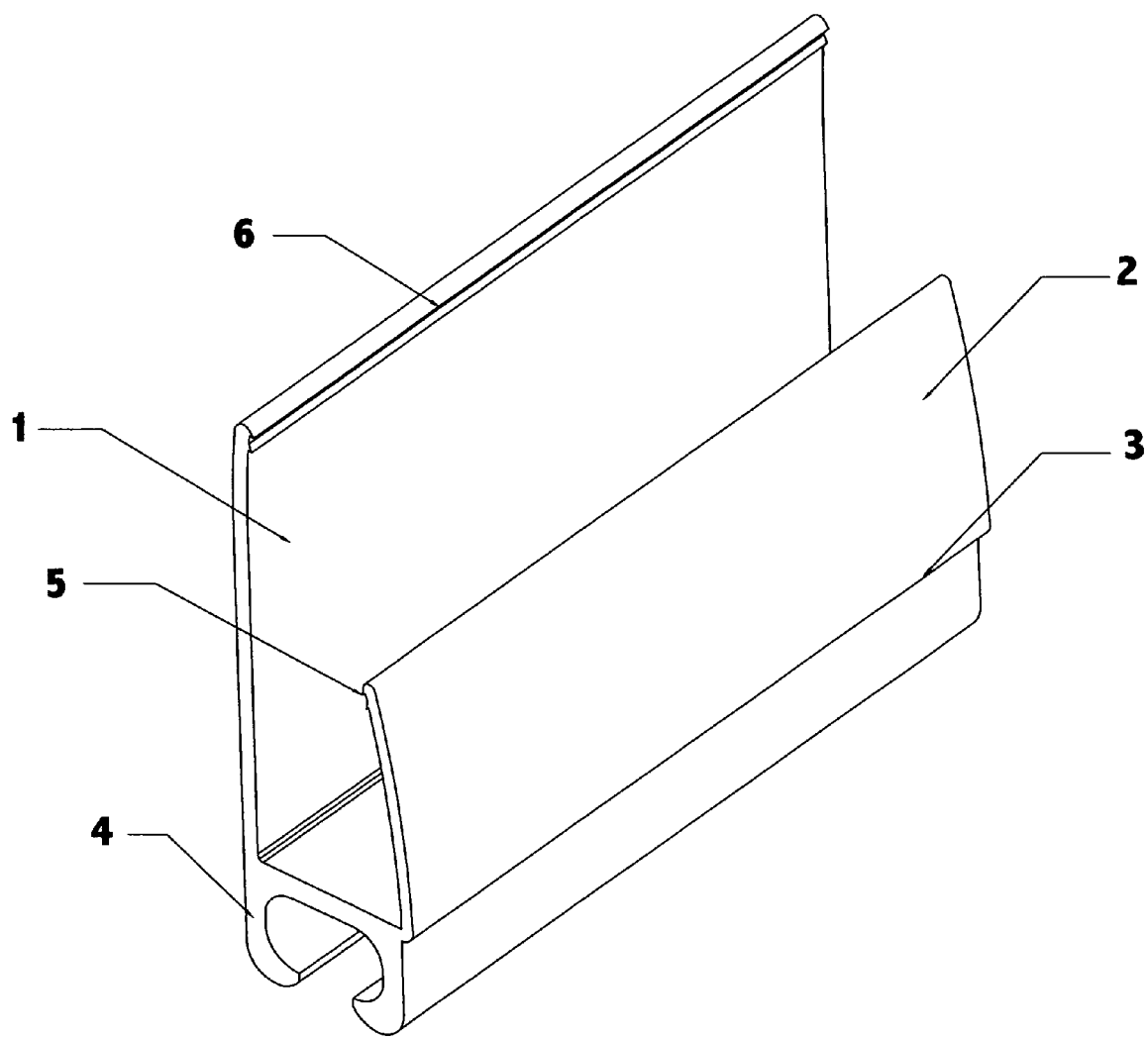
FIG. 1 is an isometric view of an embodiment of the present invention.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

Described in this document is a gypsum sheet rock gapping device/bottom edge shoe. Herein, the terms sheetrock clip, wall panel clip, gapping device, gapping shoe, J channel, anti-wicking device, moisture control device, mold deterrent, and mildew deterrent are used interchangeably.

The disclosed invention is designed to help protect the bottom edge of sheet rock/gypsum board and other associated wall finishes from being set directly in contact with floors, more notably, concrete floors. Moisture and humidity have a tendency of wicking up into the bottom edge of sheet rock when placed against a floor. The bottom edges of sheet rock are typically unprotected from moisture wicking, Over time, this moisture can and will deteriorate the walls engineered properties, possibly reducing the fire rating of the building panel, also promoting mold and mildew growth to form in and on the walls. Proper installation and application of the present invention will assist in alleviating these potential problems.

This claimed and disclosed invention is a device to be used to create a gap under the bottom edge of wall board and sheetrock wall coverings. This device/clip is placed on the bottom edge of the sheet rock during the sheetrock wall hanging process. This clip is designed to elevate the wall board off of the floor and create a consistent line of air gap across and between the bottom edge of the wallboard/sheetrock and the floor. The device, after placed onto the wall board will elevate the wall board and protect it from moisture wicking or absorbing up into the wall board or other wall materials. The gap creates the opportunity for air to pass under the bottom edge to allow moisture an evaporation or dripping affect, and for the walls to maintain its original dry status.

As stated above, it is common in the construction industry where sheetrock/gypsum board is used on finished walls, to effectively put a gap between the concrete floor and the bottom edges of the sheet rock by kicking debris and pieces of scraps beneath the sheet rock panel to set the sheet rock on as it is being fastened to the walls. This is a common practice used in hanging sheet rock without using any type of device similar to this clip disclosed herein. The application of this unique device is to increase the efficiency and safety at the construction site during the sheet rock hanging process.

II. Preferred Embodiment Wall Panel Clip

Figure 2:
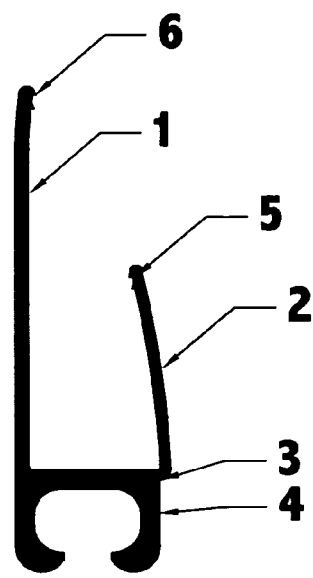
FIG. 2 is a side elevation view showing an embodiment of the present invention, the opposing side being a mirror image thereof.
Figure 3:
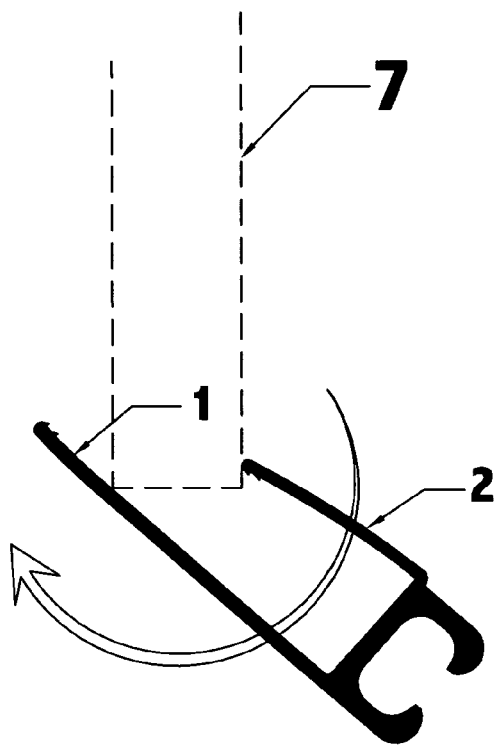
FIG. 3 is a side elevation view showing an embodiment of the present invention demonstrating a typical environment wherein the invention is being applied to a piece of sheetrock.
Figure 4:
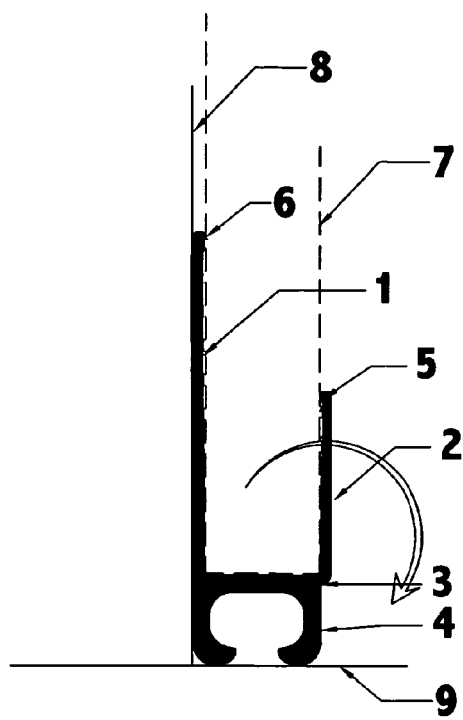
FIG. 4 is a side elevation view of the same, showing the present invention installed on the base of a piece of sheetrock.
Figure 5:
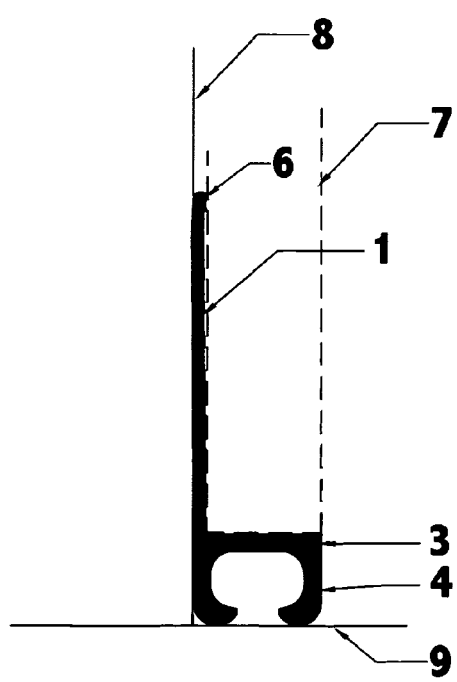
FIG. 5 is a side elevation view of the same, showing a portion of the present invention removed during installation.

Referring to the drawings in more detail, FIG. 1 shows a wall panel clip having a J-shape channel configuration with an extended bottom lip adapted to receive a sheet rock wall panel. The clip may range from one inch to 120 inches in length, and one to six inches tall depending on the requested application of the lift from the user. The back panel 1 of the clip is taller than the front panel 2. The front panel 2 may be designed to optionally break-away from the rest of the clip at a separation 3 if desired. This differentiation in heights of the front 2 and back 1 panels will aid the user in speed and swiftness of applying the clip to the bottom edge of the sheet rock/gypsum wall board 7, as shown in FIG. 3. The thickness or depth of the base formed between the front panel 2 and the back panel 1, not the height, is sized according to the thickness of the wall board 7 it is being slipped onto, typically half inch to one inch thick wall board is anticipated. The space formed between the front panel 2 and the back panel 1, as described above, may also be referred to as the compression channel. A barbed/fish hook lip 5, 6, as shown in FIG. 2 across the top front and back top edges of the front 2 and back 1 panels will assist in holding the clip into position after it is slipped onto the bottom edge by the user. The typical height and thickness of the base/bottom of the clip depending on the requested lift height will elevate the wall board 7 permanently off the floor 9 after proper installation, as shown in FIGS. 4 and 5.

The clip includes a spacer base 4, typically including a central channel and rounded edges. This allows the clip to resist the crushing weight of the wall board 7 while using minimal materials. Rounded edges along the spacer base 4 allows the clip to slide along a floor, thereby allowing a wall board 7 to be repositioned. The wall panel is then mounted to a wall structure 8, such as a stud wall. A slight kick to the bottom of the piece of sheet rock where the clip has been positioned will help set the wall board tight against the wall area it is to be permanently fastened, The clip remains in place and becomes part of the wall assembly.

The front 2 and back 1 panels of the clip are designed to provide a snug fit against the wall board 7. The panels may slope inward slightly to provide a better grip against the board.

The disclosed device may be manufactured from a number of different materials in an infinite array of colors, using such materials as recycled or raw plastic, polymer based composites, non corrosive metals, and adhesive and epoxy type composites using card board, wood or paper. Materials used to manufacture this device may be produced and tested against toxic smoke in case of fire. The materials used to manufacture this device will be made of various sizes and materials as per specifications and requested by the purchasers or user. The material must provide crush-proof strength such that the wall board 7 remains elevated off of the floor 9 at the desired height until the board is mounted to the wall structure 8.

Without the present invention, a gap between a concrete floor and the bottom edges of wall hung sheet rock panels 7 means moisture wicking will most likely occur. Mold and mildew has a greater potential of becoming present in and on the walls. Use of the present invention will also eliminate unnecessary, additional debris on the job site floors often used to raise sheet rock wall panels when installing the panels.

The invention claimed is:

1. A wall assembly comprising:
a one-piece mounting apparatus mounted to a drywall board;
said mounting apparatus comprising a channel adapted to receive a bottom edge of said drywall board, said channel including a front panel, a rear panel, and a base panel;
said base panel including a base structure mounted to a bottom face of said base panel, wherein said base structure comprises two legs extending away from the base panel terminating at a distal end, wherein each distal end is adapted to be placed against a floor surface such that said channel is raised away from said floor surface, and wherein said front panel being removable from said base panel; and
wherein said mounting apparatus raises said drywall board away from said floor surface.

2. The wall assembly of claim 1, wherein said mounting apparatus is adapted for preventing moisture from said floor surface from penetrating said drywall board.

3. The wall assembly of claim 2, wherein said mounting apparatus is comprised of a material chosen from the list: recycled plastic; raw plastic; polymer based composite; non-corrosive metal; or adhesive and epoxy type composites using a fibrous base.

4. The wall assembly of claim 1, wherein said drywall board comprises gypsum board.

5. The wall assembly of claim 1, further comprising:
said mounting apparatus including a first hooked lip located on a top edge of said front panel, a second hooked lip located on the top edge of said rear panel, and said first and second hooked lips adapted for gripping said drywall board.

6. The wall assembly of claim 1, wherein said base structure comprises a pair of legs.

* * * * *